UNITED STATES PATENT OFFICE.

CHARLES A. CATLIN, OF PROVIDENCE, RHODE ISLAND, ASSIGNOR OF ONE-HALF TO CORNELIUS S. SWEETLAND, OF SAME PLACE.

COMPOSITION FOR FLOORING, ROOFING, AND OTHER PURPOSES.

SPECIFICATION forming part of Letters Patent No. 406,563, dated July 9, 1889.

Application filed March 9, 1888. Serial No. 266,735. (No specimens.)

*To all whom it may concern:*

Be it known that I, CHARLES A. CATLIN, of Providence, in the county of Providence and State of Rhode Island, have invented a new and useful Improvement in Composition for Flooring, Roofing, and other Purposes, which improvement is fully set forth in the following specification.

This invention relates to a new material or composition of matter which is useful for a variety of purposes where great resistance to wear and to the action of the elements combined with lightness are desirable properties.

The new composition consists, essentially, of a mixture of fibrous asbestus and silicate of soda or potash, though other materials may, for special uses, be added thereto. The silicate of soda or potash is liquefied, and while in that condition the fibrous asbestus is added thereto and thoroughly incorporated and mixed therewith. On drying this mixture hardens to a dense, tough, compact, impervious, and somewhat elastic mass, in some respects resembling horn. This elastic horn-like property renders it capable of great resistance to wear. I have found it very useful for flooring for factories and like places where ordinary hard-pine flooring is quickly destroyed. In such places a flooring of the new composition of, say, one-eighth of an inch in thickness exhibits no signs of wear after six months' continuous usage.

The composition may also be utilized for roofing, being either applied in its plastic condition or first formed into roofing-tiles. It may also be formed into tiles for hearths, mantels, floors, &c., and may be utilized to displace wood and iron (possessing, as it does, the lightness of the one and the strength of the other) for various other building and architectural purposes, as for cornices and the like. As it can be produced in sheets of any desired thickness, it may be utilized for covering walls and ceilings in fire-proof and other buildings, for which purpose it may be embossed or ornamented in various ways. It may be used for sheathing or be formed into articles of hollow ware and utensils of various sorts. The composition is also particularly available in theaters for the construction of wings, flies, scenery, and stage-settings generally, where indestructibility is a most desirable property.

Many other useful applications of the new material will readily suggest themselves, and inasmuch as when first prepared it is in a plastic condition it can easily be made to take any desired form.

The composition when dry is not at first wholly insoluble, but it may be rendered so by treatment with acid or a hardening solution, as hereinafter described.

In order that my invention may be fully understood by those skilled in the art to which it relates, I will describe in detail the manner in which it is or may be carried into effect, premising, however, that the particular materials and proportions are subject to variation within certain limits without departing from the spirit of the invention.

I take a silicate of soda, which can be obtained upon the market, and is called "A" silicate, and which at ordinary temperatures is gelatinous. This is liquefied in a steam-kettle, adding a little water, if necessary, to thin the solution to work easily, and to it is then added about fifteen per cent. (15%) of its weight of fibrous asbestus. While it is important that the asbestus be in a fibrous and not in a powdery condition, the cheap short fibrous quality answers well for the purpose. The asbestus should be picked apart to mix readily with the silicate, and the mass should be thoroughly mixed to distribute the fiber uniformly. It is then allowed to stand for a few hours, when it is ready for application. If it be a floor that is to be covered, it is only necessary to have the boarding cleaned from oily and other matter that would prevent adhesion, and the plastic mass may be at once applied with a trowel, being spread evenly and smoothly over the surface.

It is necessary to make the coating about three times the thickness desired in the finished work, as the material shrinks a great deal in drying. The addition of sand, clay, or other material assists in reducing the shrinkage, but somewhat at the expense of the elasticity of the substance. Such addition also adds to its weight, which may not always be desirable.

The coating when dry is partially soluble in water. By long exposure to the action of the atmospheric carbonic acid it becomes in time wholly insoluble; but as the change takes place very slowly it is desirable to render the substance at once insoluble, which may be done by treating the coated surface with dilute acid. This is preferably, though not necessarily, done before the coating is entirely dry. Sulphuric acid may be used for the purpose. This acting on the silicate of the alkali decomposes it, silica being deposited and sulphate of soda resulting. The silica, being probably in the gelatinous condition, dries down to a perfectly-insoluble body, while the sulphate of soda effloresces to the surface, and may be removed by sweeping it off or by washing it away. It is advisable to repeat the acid treatment several times to get the best result.

Other solutions or compounds may be employed to render the substance insoluble. For example, I may employ salts of the heavy metals and of the alkaline earths, which, by combining with the silica, form insoluble compounds. Solutions of these will serve the same purpose as the acid, though the latter is preferred and is deemed to give the best results; or in mixing other materials with the asbestus and silicate I may select such as by combination with the silicate form insoluble compounds. For example, if carbonate of lime be thus employed, silicate of lime and carbonate of soda result. In fact, where sand or other silica is used, the silica thus introduced gradually enters into the compound, and a very insoluble silicate of soda results.

To secure the requisite toughness and coherence in the finished product, it is necessary to employ the asbestus in a fibrous condition. Powdered asbestus will not produce the same result. By the thorough mechanical mixing the fibers are uniformly distributed and ramify in every direction through the mass in such way as to impart to the slab or sheet when dried greater elasticity and tenacity than is found in horn, rendering it difficult to break, even when produced in thin sheets.

I am aware that heretofore it has been proposed to make a substance termed "vitrified asbestus" by immersing asbestus fiber in the form of a sheet in silicate of sodium or potassium in hydrated solution, pressing out the superfluous silicate, and drying. The resulting product differs in important respects from that produced by my process, which is readily distinguished therefrom. The said vitrified asbestus is composed mainly of asbestus having only thin cementing films of silicate between the fibers. My composition consists, as already stated, of about eighty-five per cent. of silicate having the fibrous asbestus thoroughly mixed therewith. This mixing of the fibers with the silicate makes a very different composition from that produced by dipping a sheet of asbestus fiber into a bath of silicate and removing only so much of the latter as adheres to the fibers. The latter composition is never plastic, and it would not resist the solvent action of water for any length of time. My composition is plastic when applied, and can in that condition be laid on floors, roofs, and elsewhere, and it contains insoluble silicic acid, as the result of the decomposition of the silicate by the acid solution. Each fiber is incased or protected by a layer or deposition of silica, protecting it from solvent action. By these characteristics my composition is readily distinguished from that made in the manner above indicated.

I am also aware that it has been proposed to make a material for roofing by mixing vegetable fiber with silicate of soda and afterward treating with chloride of calcium, with a view to rendering the product insoluble. Such process would result in a very fragile material. The alkali of the silicate would sooner or later act upon the vegetable fiber and destroy its strength. The use of chloride of calcium produces quite a different surface from that obtained by reaction with an acid. In the former case a precipitate of soluble silicate of calcium results, while in the latter a hard insoluble substance perfectly vitreous and cohesive is formed.

I claim as my invention—

1. The herein-described material or composition, the same being a tough, tenacious, and somewhat elastic substance composed of silicate of soda or potash having a comparatively small proportion of fibrous asbestus mixed therewith and uniformly distributed throughout the same, substantially as set forth.

2. A material or composition for roofing, flooring, and similar purposes, composed of silicate of soda or potash having fibrous asbestus mixed therewith and rendered insoluble by the addition of an acid, substantially as described.

In testimony whereof I have signed this specification in the presence of two subscribing witnesses.

CHARLES A. CATLIN.

Witnesses:
HENRY ESSEX,
STEPHEN ESSEX.